US010353378B2

(12) United States Patent
Shapiro et al.

(10) Patent No.: US 10,353,378 B2
(45) Date of Patent: Jul. 16, 2019

(54) HOMOGENIZATION OF MATERIAL PROPERTIES IN ADDITIVELY MANUFACTURED STRUCTURES

(71) Applicant: Wisconsin Alumni Research Foundation, Madison, WI (US)

(72) Inventors: Vadim Shapiro, Berkeley, CA (US); Xingchen Liu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 117 days.

(21) Appl. No.: 15/240,689

(22) Filed: Aug. 18, 2016

(65) Prior Publication Data
US 2018/0052445 A1 Feb. 22, 2018

(51) Int. Cl.
*G05B 13/04* (2006.01)
*G05B 19/4099* (2006.01)
*B33Y 50/00* (2015.01)

(52) U.S. Cl.
CPC .......... *G05B 19/4099* (2013.01); *B33Y 50/00* (2014.12); *G05B 2219/35134* (2013.01); *G05B 2219/49007* (2013.01); *Y02P 90/265* (2015.11)

(58) Field of Classification Search
CPC ............ G05B 19/4099; B29C 67/0055; B29C 67/0088; B29C 64/153; B29C 45/7693; B29C 67/0059; G06F 17/5018; G06F 17/5009; G06F 17/50; G01R 33/56341; G01V 3/30; G01V 1/306; G01V 1/30; G02B 5/3083; C21D 9/0068; E21B 43/26; B29D 11/00634; G03H 1/22; H01Q 15/0066
See application file for complete search history.

(56) References Cited

U.S. PATENT DOCUMENTS

| 9,283,695 B1* | 3/2016 | Tseng | B29C 45/7693 |
| 2003/0195725 A1* | 10/2003 | Hashash | G06F 17/5018 703/2 |
| 2015/0054204 A1* | 2/2015 | Tseliakhovich | B29C 67/0077 264/489 |
| 2017/0225402 A1* | 8/2017 | Batchelder | B29C 67/0088 |

OTHER PUBLICATIONS

Huang, Alternate Slicing and Deposition Strategies for Fused Deposition Modelling, Auckland Univ. of Tech., 2014.*
Bellini et al. Mechanical characterization of parts fabricated using fused deposition modeling, Rapid Prototyping Journal, 2003; 9, 4; ProQuest p. 252 (Year: 2003).*

(Continued)

*Primary Examiner* — Darrin D Dunn
(74) *Attorney, Agent, or Firm* — Amerson Law Firm, PLLC

(57) ABSTRACT

A method for estimating a material characteristic of an article includes receiving a material property tensor having an associated reference direction. A tool path model of an additive manufacturing process for manufacturing the article is received. A geometric model is generated based on the tool path model defining a plurality of roads arranged in layers. For each of the roads, the material property tensor is rotated to align the reference direction with a direction of a selected road and an estimated material property value is assigned to the selected road to generate a first geometry-material model of the article.

23 Claims, 6 Drawing Sheets

(56) References Cited

OTHER PUBLICATIONS

Ahn et al., "Representation of surface roughness in fused deposition modeling," Journal of Materials Processing Technology, 209:5593-600, 2009.
Boschetto et al., "Modelling micro geometrical profiles in fused deposition process," Int. J. Adv. Manuf. Technol., 61:945-56, 2012.
Sood et al, "Improving dimensional accuracy of Fused Deposition Modelling processed part using grey Taguchi method," Materials and Design, 30:4243-52, 2009.
Lee et al., "Review: Dimensional Accuracy in Additive Manufacturing Processes," Proceedings of the ASME 2014 International Manufacturing Science and Engineering Conference, MSEC2014, Jun. 9-13, 2014.
Telea and Jalba, "Voxel-Based Assessment of Printability of 3D Shapes," University of Groningen, the Netherlands end Eindhoven Unversity of Technology, the Netherlands.
Nelaturi and Shapiro, "Representation and analysis of additively manufactured parts," Computer-Aided Design, 67'68:13-23, 2015.
Ahn et al., "Anisotropic material properties of fused deposition modeling ABS," Rapid Prototyping, vol. 8, No. 4, pp. 248-257, 2002.
Dawoud et al., "Mechanical behaviour of ABS: An experimental study using FDM and injection moulding techniques," Journal of Manufacturing Processes, 21:39-45, 2016.
Steuben et al., "Implicit sliding for functionally tailored additive manufacturing," Computer-Aided Design, 2016.
Nelaturi et al., "Manufacturability Feedback and Model Correction for Additive Manufacturing," Proceedings of the ASME 2014 International Design Engineering Technical Conferences & Computers and Information in Engineering Conference, IDETC/CIE 2014, Aug. 17-20, 2014.
McCarthy, "Characterization of Geometric Deviations in FDM," Master of Science Thesis, University of Wisconsin-Madison, 2015.
Casavola et al., "Orthotropic mechanical properties of fused deposition modelling parts described by clasical laminate theory," Materials and Design, 90:453-58, 2016.
Kotlinski, Mechanical Properties of commercial rapid prototyping materials, Rapid Prototyping, 20:499-510, 2014.
Hollister and Kikuchi, "A comparison of homogenization and standard mechanics analyses for periodic porous composites," Computational Mechanics, 10:73-95, 1992.
Kanit et al., "Determination of the size of the representative volume element for random composites: statistical and numerical approach," International Journal of Solids and Structures, 40:3647-79, 2003.
Terada et al., "Simulation of the multi-scale convergence in computational homogenization approaches," International Journal of Solids and Structures, 37:2285-311, 2000.
Panetta et al., "Elastic Textures for Additive Fabrication," ACM Trans. Graph. 34, Article 135, Aug. 2015.
Schumacher et al., "Microstructures to Control Elasticity in 3D Printing," ACM Trans. Graph. 34, Article 136, Aug. 2015.
Andreassen et al., "Design of manufacturable 3D extremal elastic microstructure," Mechanics of Materials, 69:1-10, 2014.
Wu and McCullough, Constitutive Relationships for Heterogeneous Mat4erial, Developments in Composite Materials, pp. 119-187, 1977.
Korringa, "Theory of elastic constants of heterogeneous media," Journal of Mathematical Physics, 14:509-13, 1973.
Talbot and Willis, "Bounds and Self-Consistent Estimates for the Overall Properties of Nonlinear Composites," IMA Journal of Applied Mathematics, 39:215-40, 1987.
Kruener, "Bounds for Effective Elastic Moduli of Disordered Materials," J. Mech. Phys. Solids, 25:137-55, 1977.
Drugan and Willis, "A Micromechanics-Based Nonlocal Constitutive Equation and Estimates of Representative Volume Element Size for Elastic Composites," J. Mech. Phys. Solids, 44:497-524, 1996.
Moulinec and Suquet, "A numerical method for computing the overall response of nonlinear composites with complex microstructure," Comput. Methods Appl. Mech. Engrg., 157:69-94, 1998.
Brisard and Dormieux, "Combining Galerkin approximation techniques with the principle of Hashin and Shtrikman to derive a new FFT-based numerical method for the homogenization of composites," Comput. Methods Appl. Mech. Engrg., 217-220:197-212, 2012.
Vinogradov and Milton,"An accelerated FFT algorithm for thermoelastic and non-linear composites," International Journal for Numerical Methods in Engineering, 76:1678-95, 2008.
Brisard and Dormieux, "FFT-based methods for the mechanics of composites: A general variational framework," Computational Materials Science, 49:663-71, 2010.
Zeman et al., "Accelerating a FFT-based solver for numerical homogenization of periodic media by conjugate gradients," Journal of Computational Physics, 229:8065-71, 2010.
Vondrejc et al., "An FFT-based Galerkin Method for Homogenization of Periodic Media," Computers & Mathematics with Applications, Nov. 21, 2014.
Bellehumeur et al., "Modeling of Bond Formation Between Polymer Filaments in the Fused Deposition Modeling Process," Journal of Manufacturing Processes, vol. 6, No. 2, pp. 170-178, 2004.
Sun et al., "Effect of processing conditions on he bonding quality of FDM polymer filaments," Rapid Prototyping Journal, 14:72-80, 2008.
Malvern, Introduction to the Mechanics of a Continuous Medium,: Printice-Hall, Inc., 1969.
Shewchuk, "An Introduction to the Conjugate Gradient Method Without the Agonizing Pain," Carnegie Mellon University School of Computer Science, Aug. 4, 1994.
Willis, "Bounds and Self-Consistent Estimates for the Overall Properties of Anisotropic Composites," J. Mech. Phys. Solids, 25:185-202, 1977.
Suresh, "Efficient Microstructural Design for Additive Manufacturing," Proceedings of the ASME 2014 International Design Engineering Technical Conferences & Computers and Information in Engineering Conference, IDETC/CIE 2014, Aug. 17-20, 2014.
Mamadapur, "Constitutive Modeling of Fused Deposition Modeling Acrylonitrile Butadiene Styrene (ABS)," Master pf Science Thesis, Texas A&M University, Dec. 2007.
Hoffmann et al., "Geometric interoperability via queries," Computer-Aided Design, 46:148-59, 2014.

* cited by examiner

HOMOGENIZATION OF MATERIAL PROPERTIES IN ADDITIVELY MANUFACTURED STRUCTURES

This invention was made with government support under CMMI1344205 awarded by the National Science Foundation and 70NANB14H232 awarded by the National Institute of Standards and Technology. The government has certain rights in the invention.

BACKGROUND

Field of the Disclosure

The present disclosure relates generally to additive manufacturing, and, more particularly, to the analysis of material performance in additively manufactured structures.

Description of the Related Art

Additive manufacturing (AM), commonly referred to as 3D printing, transforms a material into three-dimensional parts incrementally, layer by layer or path by path. This distinctive feature gives AM advantages over the traditional manufacturing techniques, such as the ability to fabricate parts with complex shapes and internal structures without a significant increase in cost or turnaround time. In many cases, a complex heterogeneous structure with less material may be both cheaper and faster to manufacture than a part with a simpler geometry and homogeneous material, such as a solid cube. This phenomenon is sometimes referred to the "complexity paradox."

Similar to other manufacturing methods, the quality of additively manufactured parts is subject to the process limitations and machine imprecision. Due to the manufacturing process, there are various differences between the designed and the manufactured part. Fused deposition modeling (FDM) is a particular type of AM technique. An FDM tool includes a print head that extrudes a molten filament. The filament is extruded through a heated nozzle. For each layer, the nozzle moves horizontally following a piece-wise linear path. The material extruded along each line segment is commonly referred as a "road." After each deposition, the road solidifies and bonds with adjacent roads in both current and previously deposited layers. After the whole layer is deposited, either the nozzle or the printing plate shifts vertically to print the next layer. Articles built by FDM differ noticeably from their design models due to many factors, including stair-stepping on the surface of the part, the rounding of sharp corners, air gaps, and the use of infill patterns to save the printing material and printing time for "solid" regions. In contrast to other traditional manufacturing processes, the AM material undergoes a fundamental phase transformation during the AM process, changing not only its geometry but also its mechanical properties. Processing plans and parameters in AM also play a more significant role in the final performance of the part—the same nominal part geometry manufactured with two different sets of process plans will generally result in parts with significantly different properties. As a result, AM processes lead to a heterogeneous and anisotropic distribution of material properties in the interior of the fabricated part, which is not represented and accounted for in the design model of the part. In other words, the design model is no longer a suitable surrogate for the fabricated part. The accuracy of downstream applications, such as structural analysis, relies on the ability to model not only the geometry of the manufactured part, but also its material's mechanical properties.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

FIGS. 1-6 illustrate example techniques for modeling material properties of an article fabricated using an additive manufacturing (AM) process. In general, the material properties of the article may be estimated for at least three distinct scales, the micro scale, the meso scale and the macro scale. Material phase changes take place at the micro scale. The planned layers and roads for the manufacturing process represent the meso scale. Fusing the micro scale properties with the meso scale planned path provides effective properties of the manufactured article. In the illustrated example, an approach is presented for modeling and estimating the effective (macroscopic) material properties in the interior of an article produced by the fused deposition modeling (FDM) process using homogenization. In general homogenization replaces the known detailed geometry and multi-phase material properties of a material at a finer scale by simpler effective geometric domain and single-phase (solid) material properties at a coarser scale. For example, the effective domain may be expressed as a cuboid, and the effective material properties may be estimated from average stress and strain relationship over the cuboid. Homogenization is challenging for AM articles for two reasons: (1) geometry and material properties may not be known at the micro and meso scales; and (2) homogenization requires significant computational resources.

Figure 1:
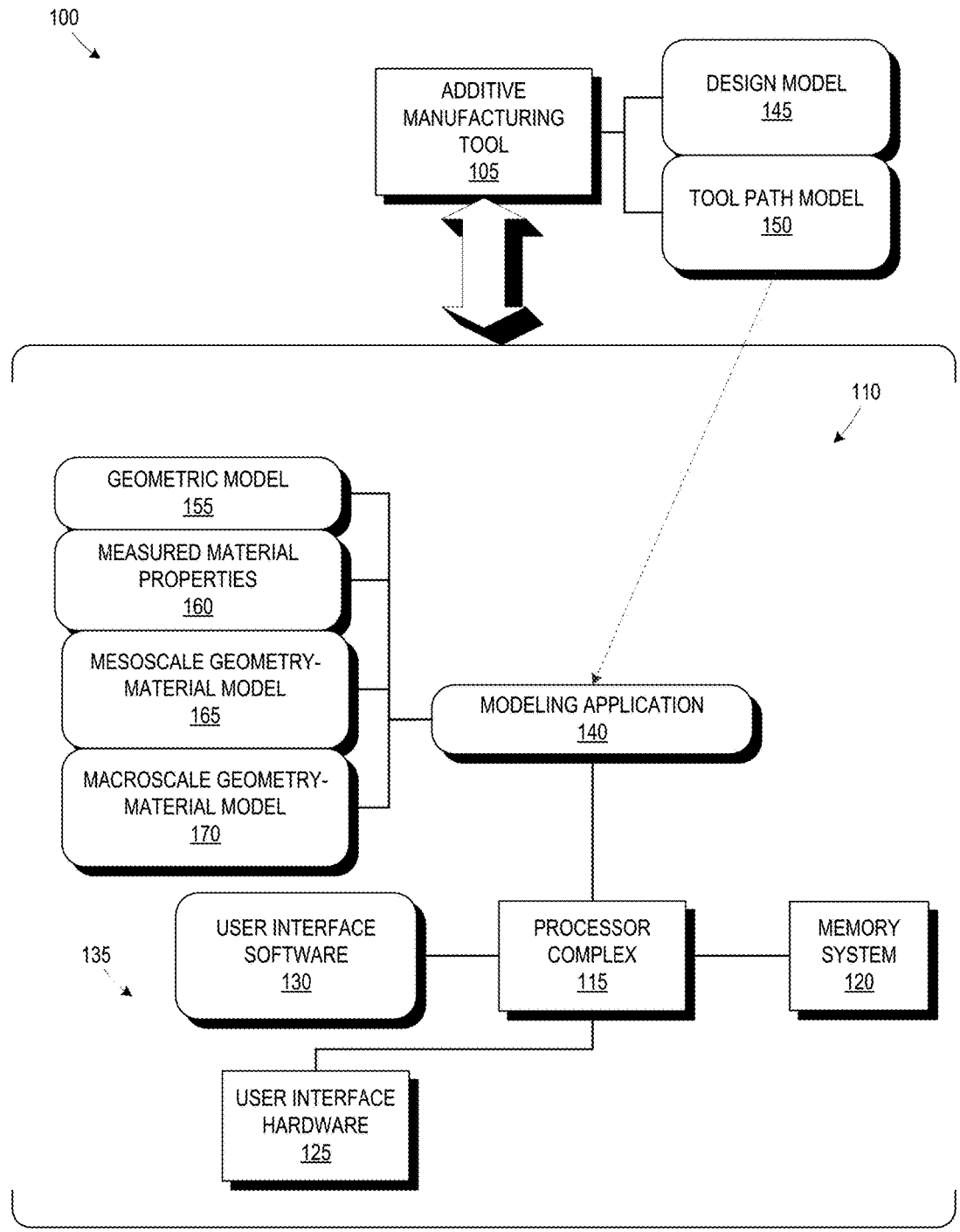
FIG. 1 is a simplified block diagram of a material modeling system in accordance with some embodiments.

FIG. 1 is a simplified block diagram of a modeling system 100 including an additive manufacturing (AM) tool 105 and a computing system 110. The computing system 110 may be implemented in virtually any type of electronic computing device, desktop computer, a server, a minicomputer, a mainframe computer or a supercomputer. The present subject matter is not limited by the particular implementation of the computing system 110. The computing system 110 includes a processor complex 115 communicating with a memory system 120. The memory system 120 may include nonvolatile memory (e.g., hard disk, flash memory, etc.), volatile memory (e.g., DRAM, SRAM, etc.), or a combination thereof. The processor complex 115 may be any suitable processor known in the art, and may represent multiple interconnected processors in one or more housings or distributed across multiple networked locations. The computing system 110 may include user interface hardware 125 (e.g., keyboard, mouse, display, etc.), which together, along with associated user interface software 130, comprise a user interface 135. The processor complex 115 executes software instructions stored in the memory system 120 and stores results of the instructions on the memory system 120 to implement a modeling application 140, as described in greater detail below.

Figure 2:
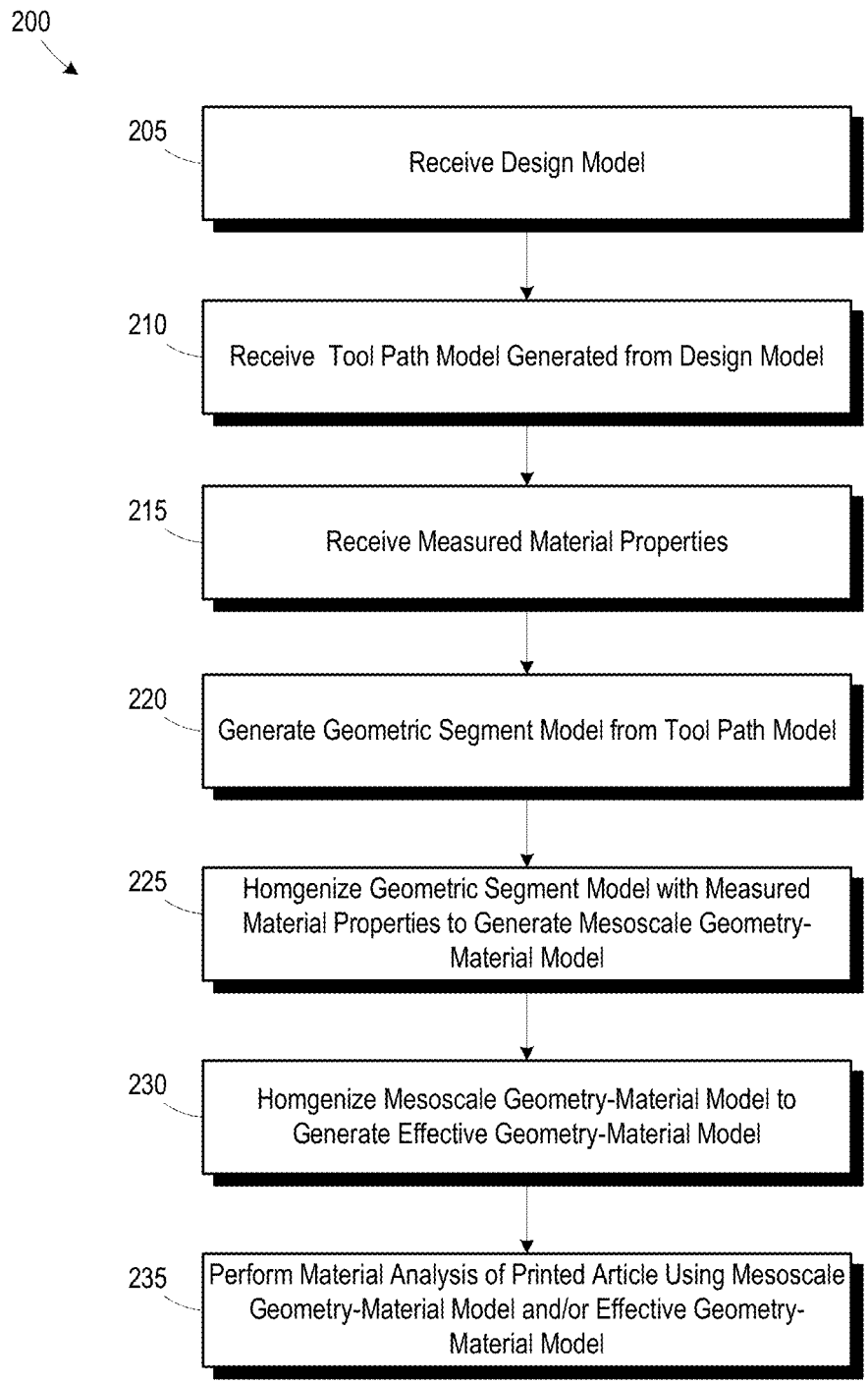
FIG. 2 is a flow diagram illustrating a method for modeling material properties of an additive manufacturing article in accordance with some embodiments.

FIG. 2 is a flow diagram illustrating a method 200 for modeling material properties of an additive manufacturing article in accordance with some embodiments. In method block 205, the AM tool 105 receives a design model 145 of an article to be manufactured. The design model 145 may be a solid model.

Figure 3:
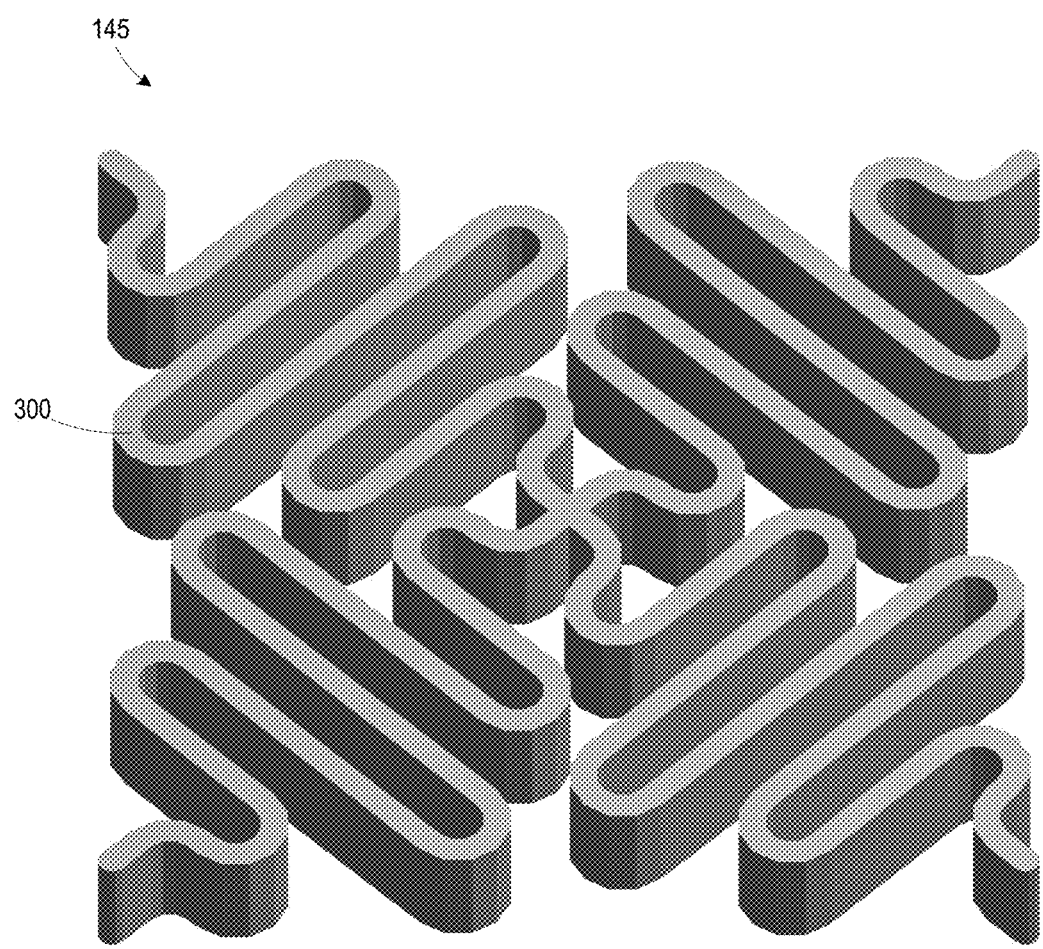
FIG. 3 is a diagram of a design model of an article to be manufactured in accordance with some embodiments.

FIG. 3 illustrates the design model 145 of an article 300 to be manufactured in graphical form. In some embodiments, the solid model may be converted to a stereolithography model that represents the article as a triangle tessellation that defines the boundaries of the article 300. The design model 145 illustrated in FIG. 3 is a portion (e.g., unit cell) of a two-dimensional infill pattern that may be used by the AM tool 105.

In method block 210, the AM tool 105 receives a tool path model 150 generated based on the design model 145 representing the paths, or roads, for each layer that the AM tool 105 will implement to build the article. The tool path model 150 may sometimes be referred to as "G-code." The tool path model 150 includes parameters, such as build direction, nozzle diameter and infill percentage. For a given "solid" region of the article, the AM tool 105 may employ a designated infill pattern.

Figure 4:
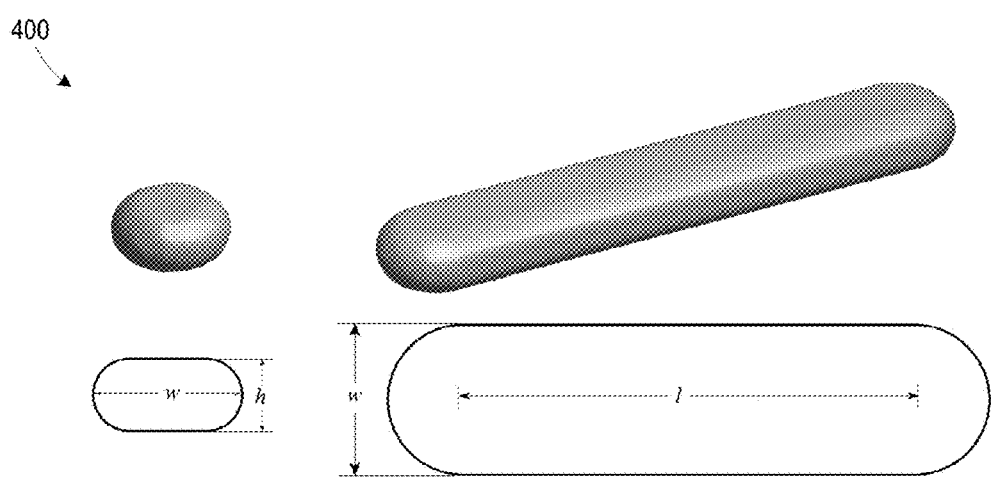
FIG. 4 is a diagram of an exemplary road generated in an additive manufacturing process in accordance with some embodiments.

FIG. 4 illustrates an exemplary road 400, having a characteristic length 1, width w and height h. The AM tool 105 constructs the article 300 by forming a series of roads 400 over multiple layers to approximate the shape defined by the design model 145.

Figure 5:
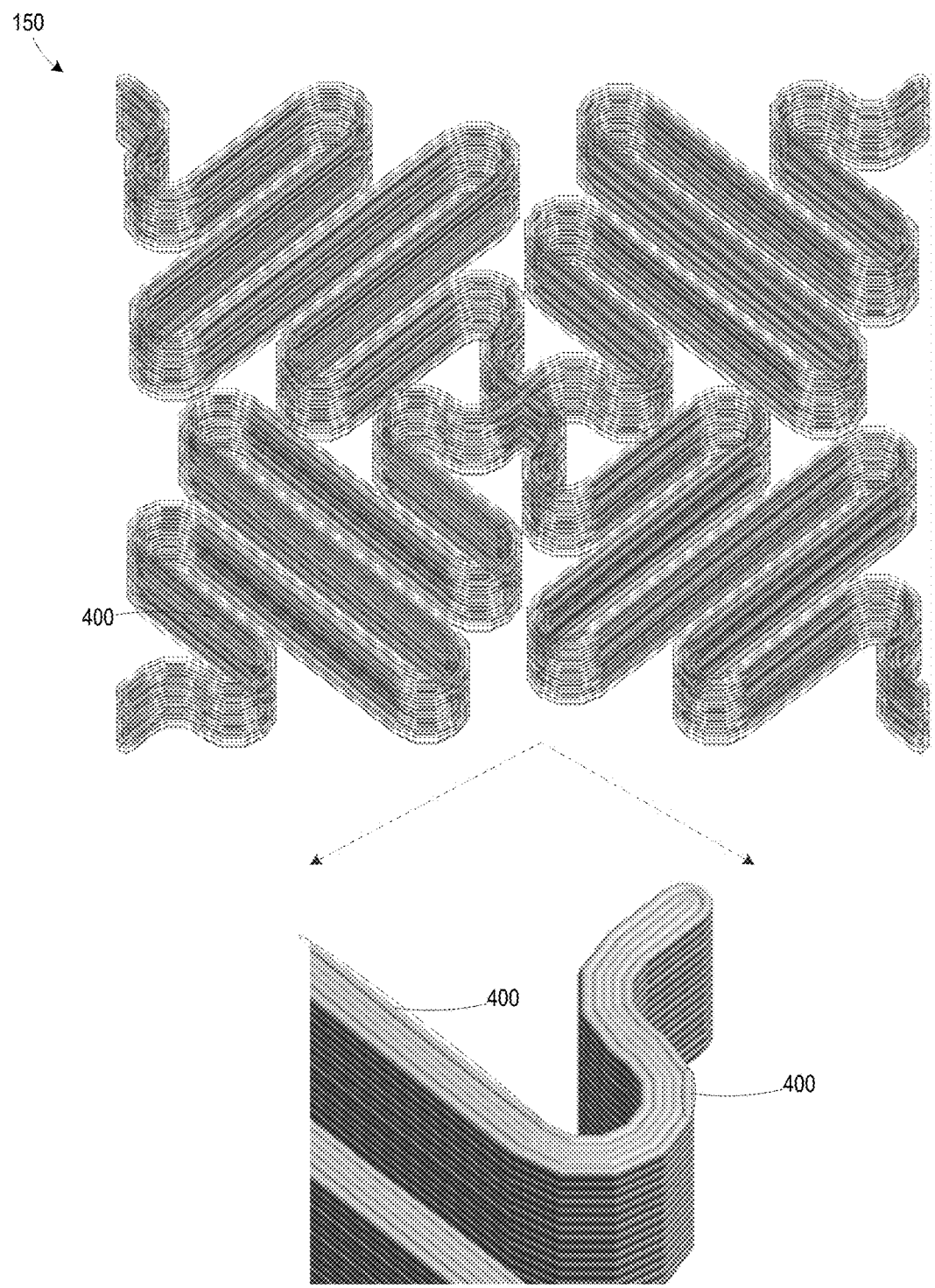
FIG. 5 is a diagram of a geometric segment model of the article to be manufactured in accordance with some embodiments.

FIG. 5 illustrates the construct of the printed device resulting from the execution of the tool path model 150 by the tool. The tool path is decomposed into a plurality of layers and linear road segments having dimensions consistent with the volume of material being deposited and the speed and direction of the print head. At any given instant, the print head deposits some minimum manufacturing volume (MMV), whose shape may be approximated in terms of simple quadratic and/or superelliptic primitives with dimensions determined by the road width and layer height. The shape of the road may be represented as the sweep of MMV along the toolpath specified by the instructions in the tool path model 150. Sweeping the MMV over all toolpaths in the tool path model 150 yields an approximation of geometry discretized by the printing process, as represented in the illustration of FIG. 5. Although linear segments are illustrated, in some embodiments, the segments may be curved segments.

Figure 6:
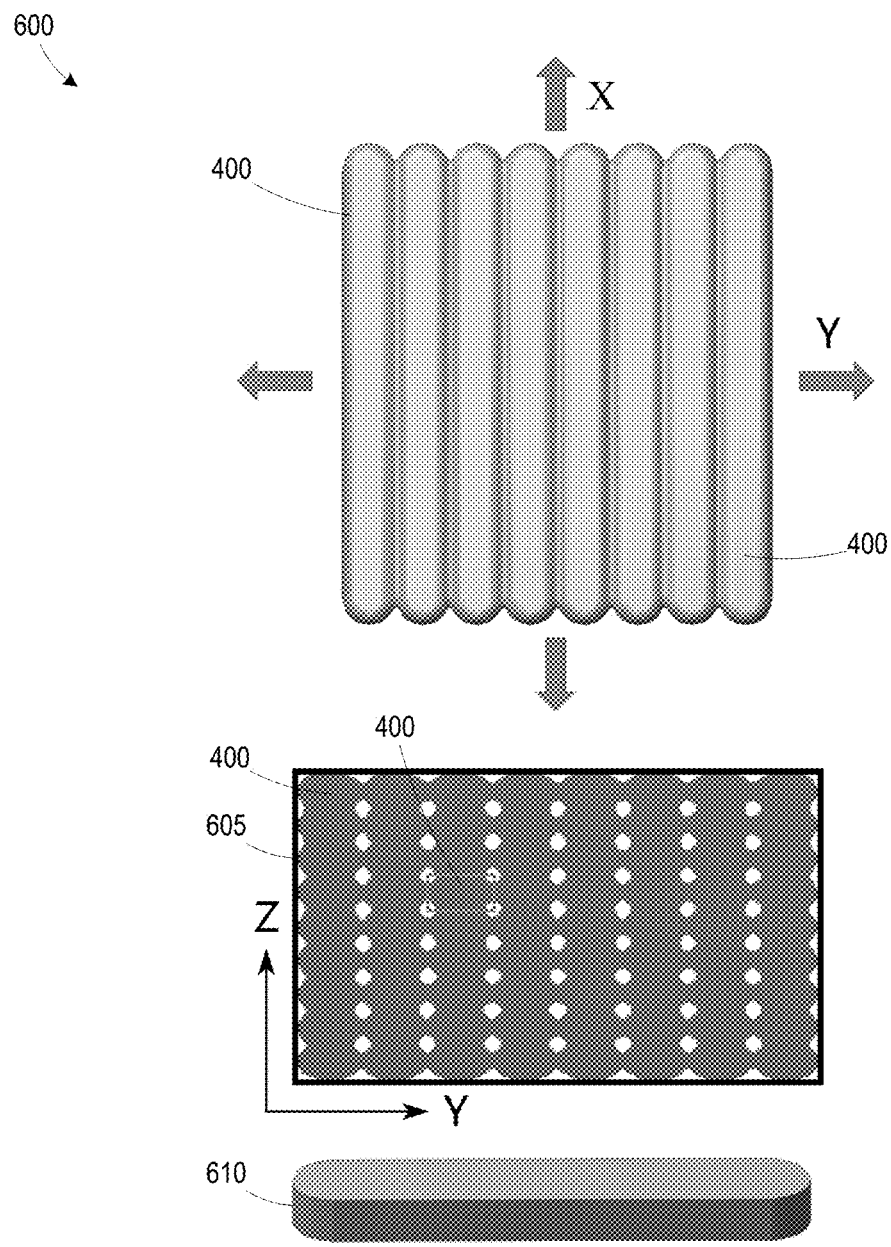
FIG. 6 is a diagram of a test specimen formed by uniform layers of roads in accordance with some embodiments.

In method block 215, the modeling application 140 receives measured material properties 160 for the material used in fabricating the article 300. AM tool manufacturers typically publish the effective material properties of a specimen formed by uniform patterns of parallel roads. FIG. 6 illustrates a test specimen 600 formed by uniform layers of roads 400. In general, test specimens 600 are printed in shapes per material testing standards (e.g., ASTM D3039) with material roads aligned along the axial, transverse or cross directions. Measurements of the specimen 600 determine the compounded effects of the stiffness of the roads, air gaps and the bonding between the roads. The properties are averaged over an effective domain 605 (shown by the rectangle) where they are assumed to be constant.

In method block 220, the modeling application 140 receives the tool path model 150 and generates a geometric model 155 based thereon. The geometric model 155 is constructed to be consistent with the specimen 600 and the resulting effective domain 605. The illustration of FIG. 5 shows the actual printed roads 400 and gaps between the roads. Since the effective domain 605 accounts for the air gaps and road interfaces, the geometric model 155 is not defined in accordance with the roads 400 illustrated in FIG. 5, but, rather, the road 400 shown in FIG. 4 is reinterpreted as having a rectangular cross-section shown by the road 610 at the bottom of FIG. 6. The geometric model 155 represents the structure of FIG. 5 using segments (e.g., linear or curved) defined according to the roads 610. This reinterpretation is consistent with the material measurement process that assumes the effective rectangular cross-section of the specimen 600 represented by the domain 605 does not have any voids. Secondly, because the measurement specimen 600 is a periodic arrangement of parallel roads, the measurement procedure implies that the measured material properties remain constant and are identical on the cross-section of each individual road. This means that the measured anisotropic material properties can now be assigned based on the reinterpreted geometry and the direction of the road, while eliminating the need to model air gaps and bonding stiffness. In some embodiments, the simplifications embodied in the effective domain 605 may vary, and the resulting adaptation of the geometric model 155 to provide consistency between the measurement specimen 600 and the model 155 may also vary.

The geometric model 155 provides a first approximation of the mesoscale geometry-material model, based on the assumption that most of the differences between the mechanical performance of the designed and printed structures originate in the process planning stage. This assumption is reasonable because the air gaps and the bonding interface between the roads, which are modeled by the idealized geometry model, impact the mechanical performance of the printed structure far more significantly than dimension inaccuracy and printing imperfections due to gravity and random events, such as inconsistent polymer flow.

As described herein, the modeling application 140 performs homogenization by separating two distinct causes that determine the effective material properties: (1) the anisotropy of the base material, which is determined by the properties of the filament, bonding and process parameters; and (2) the anisotropy and heterogeneity resulting from geometric discrepancies, build orientation, direction of the roads and use of infill patterns. This approach effectively defines anisotropic properties of the base material in (1) that can then be used to simulate the effects of (2). The following discussion illustrates how to construct the anisotropic model of the base printed material that is consistent with the changing direction of the roads.

The effective geometry and material models of the FDM structures are interdependent and cannot be treated separately. The difficulty is that this interdependence is implicit in the (inconsistent) assumptions underlying the geometry model and material measurement procedures, but it cannot be used explicitly to express either model in terms of the other. In the illustrated embodiment, the modeling application 140 simultaneously modifies both models of geometry and of material, in order to bring them into the agreement and construct a consistent effective geometric model 155.

In general material properties may be measured using a test specimen, such as the specimen 600 illustrated in FIG. 6. However, since the measured properties are direction dependent, they cannot be applied directly to the geometric model 155, which exhibits varying orientation and spacing. In method block 225, the modeling application 140 homogenizes the geometric model 155 based on the measured material properties to generate a mesoscale geometry-material model 165.

Tensors are commonly used to represent the constitutive relations in computer simulations of models of physical phenomena. A constitutive relation approximates the response of a material to external stimuli and is specific to that material and physical phenomena. When the physical model is one-dimensional, the constitutive relation is frequently expressed as a simple proportionality constant. For example, in a one-dimensional model of a spring, the elastic spring constant measures the ratio of applied force to elongation of the spring. When the physical problem is three-dimensional, many such scalar parameters are combined into a tensor to account for proportionality relations measured in different directions. A tensor may be represented as n-dimensional matrix (array); the rank or order of the tensor is the number of indices in such an array. In general, material properties are represented by a tensor of rank 2 or rank 4.

As material property tensors are specific to a material and physical phenomena, the tensors are typically constructed from multiple measured material properties or constants. For example, a fourth rank tensor can be constructed from one or more material properties such as Young's modulus, bulk modulus, shear modulus, Poisson's ratio, Lamé parameters, and P-wave modulus that are measured from a single or multiple experiments.

A second rank tensor can be constructed from one or more material properties such as (electrical and thermal) resistivity, (electrical and thermal) conductivity, dielectric constant, magnetic permeability, and diffusion coefficient that are measured from a single or multiple experiments.

Figure 7:
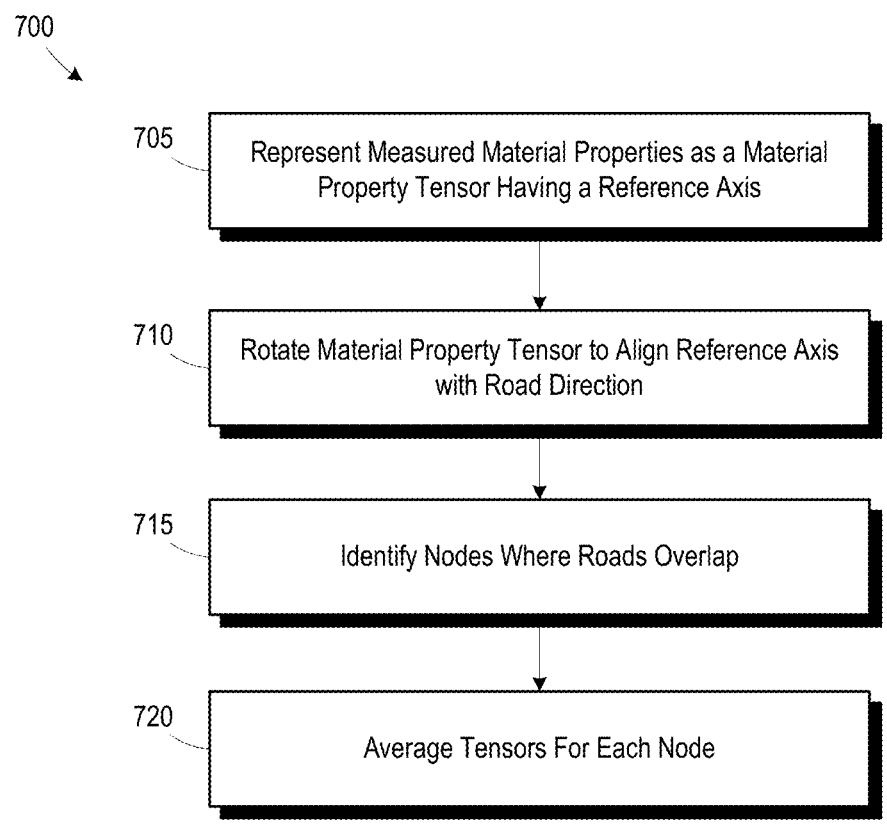
FIG. 7 is a flow diagram illustrating a method for generating a mesoscale geometry-material model in accordance with some embodiments.

FIG. 7 is a flow diagram illustrating a method for generating the mesoscale geometry-material model 165 in accordance with some embodiments. To implement homogenization, the modeling application 140 transforms a tensor representing the measured material properties 160 to be consistent with the direction of individual roads 610. The material properties 160 are measured in a coordinate system with a reference Z-axis pointing in the build direction and a reference X-axis aligned with the direction of the roads in the specimen (see FIG. 6). In method block 705, the modeling application 140 represents the measured material property by the following transverse isotropic compliance tensor (i.e., a 4th order tensor):

$$S = \begin{bmatrix} \frac{1}{E_x} & -\frac{v_{xp}}{E_x} & -\frac{v_{xp}}{E_x} & 0 & 0 & 0 \\ -\frac{v_{xp}}{E_x} & \frac{1}{E_p} & -\frac{v_p}{E_p} & 0 & 0 & 0 \\ -\frac{v_{xp}}{E_x} & -\frac{v_p}{E_p} & \frac{1}{E_p} & 0 & 0 & 0 \\ 0 & 0 & 0 & \frac{1+v_p}{E_p} & 0 & 0 \\ 0 & 0 & 0 & 0 & \frac{1}{2G_{xp}} & 0 \\ 0 & 0 & 0 & 0 & 0 & \frac{1}{2G_{xp}} \end{bmatrix}, \quad (1)$$

where $E_p$, $v_p$ and $E_x$, $v_x$, are Young's moduli and Poisson ratios in the y-z symmetry plane and x-direction, respectively. $G_{xp}$ is the shear modulus in the x-direction. The elasticity tensor, C, is calculated as the inverse of the compliance tensor, S. Note that y-z is the symmetry plane, which is different from the usual convention that x-y is the symmetry plane.

The roads 610 can be printed along any direction within a particular layer while remaining perpendicular to the build direction. To align the x axis of measurement (see FIG. 6) with the road direction, this fourth-order elasticity tensor is rotated (method block 710) within the layer:

$$C'_{mnop} = R_{mi} R_{nj} R_{ok} R_{pl} C_{ijkl} \quad (2)$$

$R_{ij}$ is the ij-th component of R:

$$R = \begin{bmatrix} \cos\theta & -\sin\theta & 0 \\ \sin\theta & \cos\theta & 0 \\ 0 & 0 & 1 \end{bmatrix}, \quad (3)$$

and θ is the angle between the x axis and the road direction.

In method block 715, the modeling application 140 identifies nodes where two or more roads 610 overlap (e.g., corners and intersections). In method block 720, the elasticity tensor is averaged over all the overlapping roads in a node.

The mesoscale geometry-material model 165 is conveniently represented by extending the implicit sweep-based representation of the idealized printed geometry. The point membership of a given query point against such a representation is determined by its point membership against the MMV centered at its nearest point on the toolpath.

In the mesoscale geometry-material model 165, a transformed material tensor is associated with every road 610. When a material tensor is queried at a point, both the point and the relevant roads 610 are simply projected onto the horizontal x-y plane of the layer (i.e., perpendicular to the build direction). The two-dimensional point membership classification against the projected road effectively eliminates the air gaps between the adjacent bonded roads, while other voids within the layers can still be recovered. This implicit representation is sufficient for many downstream applications.

In some embodiments, a single measured material property tensor may be employed for all of the roads in all of the layers. In other embodiments, the measured material properties 160 maybe provided as a library of tensors, each measurement entry being associated with a particular 3D pattern, structure or configuration. Examples of 3D-printed road configurations that may be included in a library include roads forming a T-section, roads joined at different angles, sections including the first 5, 10 or 15 layers of the roads since they tend to be tightly packed due to gravity, specimens created by changing the (uniform) road direction between the layers (15, 30, 45, 60, 75 and 90 degrees), patterns of roads/layers printed at different time intervals (different intervals affect the bonding strength between roads/layers and hence affect stiffness in horizontal or vertical directions), specimens printed with different chamfer/substrate temperature, specimens with different nozzle diameter/printing speed, specimens with different filament material (ABS, PLA, different colors), etc. The modeling application 140 may select the appropriate measured material property tensor for the structure being evaluated and rotate the tensor as described above. Where structures are encountered that do not include specific library entries, the default road tensor may be used.

In method block 235, a material analysis of the printed article is performed using the mesoscale geometry-material model and/or the effective geometry-material model. In some embodiments, the mesoscale model developed above may be used directly for performing mechanical analysis on an FDM printed article, however, discretization of the domain at a scale finer than the road geometry may result in an excessively large simulation model.

In some embodiments, a further homogenization may be performed on the constructed mesoscale geometry-material model to estimate the macroscopic material properties in the interior of an FDM printed structure.

In method block 230, the modeling application 140 homogenizes the mesoscale geometry-material model 165 to generate a macroscale effective geometry-material model 170. The following discussion demonstrates homogenizing a mesoscale structure made of the deposited roads for its effective elasticity tensor. The effective elasticity tensor $C^{eff}$ of a heterogeneous material can be defined as:

$$\bar{\sigma} = C^{eff} \bar{\in}, \quad (4)$$

where $\bar{\in}$ and $\bar{\sigma}$ are the mean value of strain $\in$ and stress $\sigma$ in the material sample. Note that the effective tensor is almost never the volume average of its constituent materials. In fact, the volume average serves as an upper bound of the effective properties and is almost never achieved in practice.

Due to the symmetry of the strain and stress tensor, a set of six independent experiments is required for measuring $C^{eff}$. For a heterogeneous material with elasticity tensor C. Subject to the displacement boundary condition, the displacement u, stress σ, strain ∈, and body force b conform to the following equilibrium equations:

$$\text{div } \sigma + b = 0, x \in \Omega$$

$$\sigma = C \in, \in = \tfrac{1}{2}[\nabla u + (\nabla u)^T],$$

$$u(x) = u^0(x), x \in \partial\Omega. \quad (5)$$

Given a homogeneous reference comparison material with the constant elasticity $C^0$, the stress polarization tensor τ may be defined:

$$\tau = \sigma - C^0 \in = (C - C^0) \in. \quad (6)$$

Substituting Equation (6) into Equation (5) leads to the solution of ∈, also known as the Lippmann-Schwinger equation:

$$\epsilon(x) = -\int_\Omega \Gamma(x, x') \delta C(x') \epsilon(x') dx' + \epsilon^0(x) \quad (7)$$

$$\Gamma_{ijpq}(x, x') = \left. \frac{\partial^2 G_{ip}(x, x')}{\partial x_j \partial x'_q} \right|_{(ij),(pq)},$$

where the bracketed subscripts imply symmetries on (ij) and (pq), $\in^0$ is a constant strain field resulting from the prescribed $u^0$, and δC represents the variations in elasticity (δC=C−C0), and G is the Green's function of an infinite size material:

$$[C_{ijkl}(x) G_{kp,l}(x,x')]_{,j} + \delta_{ip} \delta(x-x') = 0. \quad (8)$$

The closed form expressions of Γ and G are explicitly known in the frequency domain. The solution of Equation (7) is the strain tensor distribution ∈(x) within the material domain. The stress tensor field is subsequently computed as the point-wise multiplication of the modeled material elasticity tensor field by the strain tensor distribution: σ(x)=C(x)∈(x). The present implementation follows the notation where the 2nd-rank strain and stress tensors are mapped to six-dimensional vectors and the 4th-rank elasticity and compliance tensors are mapped to 6×6 matrices. After repeating this process six times independently, the effective elasticity tensor can be computed as:

$$C^{eff} = \begin{bmatrix} \vdots & \vdots & \vdots & \vdots & \vdots & \vdots \\ \sigma_1 & \sigma_2 & \sigma_3 & \sigma_4 & \sigma_5 & \sigma_6 \\ \vdots & \vdots & \vdots & \vdots & \vdots & \vdots \end{bmatrix} \begin{bmatrix} \vdots & \vdots & \vdots & \vdots & \vdots & \vdots \\ \epsilon_1 & \epsilon_2 & \epsilon_3 & \epsilon_4 & \epsilon_5 & \epsilon_6 \\ \vdots & \vdots & \vdots & \vdots & \vdots & \vdots \end{bmatrix}^{-1}. \quad (9)$$

If the input strain vector is of unit length and parallel to the axes, the strain matrix in Equation (7) will be an identity matrix so that the inversion is not required. This situation arises because the averaged strain is equals the prescribed constant strain.

Equation (7) is a Fredholm integral equation of the second type. A conventional solution to Equation (7) requires Neumann series expansion. The integral term in Equation (7) is efficiently evaluated through Fourier transform. A fixed-point iteration following the Neumann series expansion may be used:

$$\in^{i+1}(x) = \in^i(x) - \mathcal{F}^{-1}[\hat{\Gamma} \mathcal{F}(\delta C \in^i(x))], \quad (10)$$

where $\mathcal{F}$ and $\mathcal{F}^{-1}$ represent the forward and inverse Fourier transform and $\hat{\Gamma}$ is the Green's operator in the frequency domain. However, this conventional method suffers slow convergence when the contrast of material properties increases, which is undesirable for the present application where the phase contrast goes to infinity with the existence of air gaps.

As described herein, Equation (7) may be solved by converting it into a system of linear equations. Though the integration kernel Γ in Equation (7) is inseparable in the continuous domain, it can be separated approximately with the following piece-wise linear approximation:

$$\Gamma(x, x') \delta C(x') \approx \sum_{j=1}^{N} u_j(x) v_j(x'), \quad (11)$$

$$u_j(x) = \Gamma(x, j) \delta C(j), \quad v_j(x') = \begin{cases} 1, & \text{if } x' = j \\ 0, & \text{if } x' \neq j \end{cases}.$$

The following linear system can be derived from Equation (7):

$$\left[ \delta_{ij} + \sum_{j=1}^{N} \Gamma_{ij} \delta C_j \right] \epsilon_j = \epsilon_i^0. \quad (12)$$

Or in matrix form:

$$A \epsilon = \epsilon^0, \quad (13)$$

$$A = \begin{bmatrix} I + \Gamma_{11} \delta C_1 & \Gamma_{12} \delta C_2 & \cdots & \Gamma_{1N} \delta C_N \\ \Gamma_{21} \delta C_1 & I + \Gamma_{22} \delta C_2 & \cdots & \Gamma_{2N} \delta C_N \\ \vdots & \vdots & \ddots & \vdots \\ \Gamma_{N1} \delta C_1 & \Gamma_{N2} \delta C_2 & \cdots & I + \Gamma_{NN} \delta C_N \end{bmatrix},$$

where $\Gamma_{i,j}=\Gamma_{i-j}=\mathcal{F}^{-1}(\hat{\Gamma}(\xi))$. Note that every block in A is a 6×6 matrix representing a 4th rank tensor. In general, A is not symmetric. However, by letting:

$$B = A\delta C^{-1} \quad (14)$$

$$= \begin{bmatrix} \delta C_1^{-1}+\Gamma_{11} & \Gamma_{12} & \cdots & \Gamma_{1N} \\ \Gamma_{21} & \delta C_2^{-1}+\Gamma_{22} & \cdots & \Gamma_{2N} \\ \vdots & \vdots & \ddots & \vdots \\ \Gamma_{N1} & \Gamma_{N2} & \cdots & \delta C_N^{-1}+\Gamma_{NN} \end{bmatrix},$$

the linear system transforms into:

$$B\delta C(\delta C^{-1}\tau)=\in^0. \quad (15)$$

The parameter $\delta C$ can be seen as the right preconditioner for the linear system with $\tau$ as the unknown. Since only $\in$ is required for homogenization, the preconditioned system $B\delta C \in = \in^0$ can be solved. $\Gamma$ is symmetric in that $\hat{\Gamma}$ is an even function by definition. Given $\delta C$ is also symmetric as an elasticity tensor, B is symmetric. The preconditioned linear system may be solved by the conjugate gradient (CG) method.

The two-dimensional scalar electrostatics are solved based on the trigonometric collocation method and its application to the Helmholtz equation. It is believed that the corresponding system of equations is not symmetric. Solving the system with both the classical CG algorithm and the bi-conjugate gradient (BiCG) algorithm provides almost identical results, with the differences being attributed to the accumulation of round-off errors. This result arises since the system is, in fact, symmetric when treating $\tau$ as the unknown and $\delta C$ as the preconditionor.

The techniques discussed herein allow the prediction of effective material properties of FDM printed structures. Given the manufacturing process plan and widely available material specifications, the mesoscale geometry-material model 165 of the printed structure that captures the heterogeneity and anisotropy resulting from the printing process is generated. This implicit representation of the mesoscale geometry-material model 165 may be queried and homogenized at the macro scale to predict the macroscale geometry-material model 170 properties of the printed structure that account for build orientation, directional changes, infill patterns, and other mesoscale details of 3D printing. To generate the macroscale geometry-material model 170, homogenization is performed using Green's function, showing that the corresponding linear system is symmetric and positive definite, and can be efficiently solved by the conjugate gradient method with matrix-vector multiplications evaluated in the frequency domain.

Similar homogenization techniques apply to other material properties, such as thermal and electrical conductivity, dielectric constant, magnetic permeability and diffusion coefficients, and other material properties that share the same general form as the linear elasticity tensor. A common premise is that such material properties involve a physical measurement of a "material specimen." In additive manufacturing, the specimen is made up from roads and layers, whose geometry is effectively "homogenized" or averaged in the measurement process.

There are two main cases depending on whether the measured quantities are scalar (e.g., temperature at a point) or vector (e.g., displacement or forces). When the measured physical quantities are vectors, the material measurement is represented by a 4th-order tensor, which is represented by the 6×6 matrix in Equation (1). When measured quantities are scalars (for example, temperature), the material measurement is a 2nd-order tensor that is represented by a simpler 3×3 matrix (thermal conductivity).

For example, to model a scalar parameter, such as thermal conductivity, the techniques described above may be modified. The test specimens may be prepared in predetermined shapes per ASTM Standard D5930-01 with different uniform road configurations and tested for thermal conductivity.

The thermal conductivity may be provided in tensor/matrix form in Equation (1). Thermal conductivity is mathematically described by 2nd rank tensors, which is of lower rank comparing to the elasticity tensor (4th rank). Only the first 3×3 submatrix in Equation (1) is needed and the rest may be set to zero. The thermal conductivity tensor may be rotated with the direction of the road as in Equation (2) to generate the mesoscale geometry-material model 170. Only $R_{mi}$ and $R_{nj}$ are needed to rotate the 2nd rank tensor. $R_{ok}$ and $R_{pl}$ may be set to the identity matrix.

To homogenize for the effective thermal conductivity and generate the macroscale geometry-material model 170, the equilibrium equations for thermal conductivity may be used in Equation (5) and the Green function for thermal conductivity may be used in Equation 7.

The previous discussions above refer to a single material property. But many problems require using multiple material properties simultaneously. For example, thermo-elasticity is a material property that needs to be determined to predict if the manufactured part will warp or deform in some other way (either at mesoscale or macroscale). In this case, each of the properties (elasticity, conductivity and thermal expansion) may be estimated using the techniques described herein, or some of the properties could be measured and some could be estimated. Thermal-elasticity problems may be solved using some combination of measured/estimated properties at mesoscale or macroscale.

Similar mesoscale and macroscale geometry-material models 165, 170 of printed structures, as well as their subsequent homogenization, may be employed with other additive manufacturing processes, such as Selective Laser Sintering, Stereolithography and Inkjet printing. Depending on the required accuracy, more measurements from different configurations and/or new models such as thermal history may be introduced. Stereolithography and Inkjet printing are very similar to FDM in the sense that the influence of the road is local. The approach is also applicable to metal printing, but it is complicated due to high heat conductivity of the metal, where one newly printed road may impact the mechanical performance of 3 or 5 of its adjacent roads. To address such issues, a library including most of the roads configurations may be built, or an additional thermal history model may be provided if the library becomes too large to manage.

The above descriptions are generic and in this sense cover all mathematical situations. However, some special cases of material properties are associated with classes of designs and properties. In particular, functionally graded materials are materials where the material properties vary from point to point within a part, and many applications seek to design and control "functional gradation" of materials. Material anisotropy refers to the explicit control of directional properties that are very common in biological and composite structures. These examples represent other cases where the techniques described herein may be used—either at mesoscale or macroscale.

The techniques described herein also have numerous applications. In one application, a verification may be conducted that the manufactured part meets the required material specifications dictated by the design requirements. Such requirements may be based on prior knowledge or physical tests.

Engineering analysis and simulation, typically using Finite Elements, Finite Differences or other numerical methods, require knowing material properties to perform subsequent computations. In general, the mesoscale geometric material model 165 may be thought of as a model of the "manufactured part." Simulation at mesoscale may be used to predict whether a part may be manufactured or not, for example, if the part breaks without support structures or due to excessive reheating.

A simulation model may be used to predict how the mesoscale geometry-material model 165 behaves under externally applied boundary conditions. Simulation methods usually discretize geometry-material models into a grid or a mesh, and then use a numerical method to perform the analysis/simulation.

Simulation at macroscale may be employed to verify the manufactured part will perform as intended, e.g., if it will break under intended forces and restraints or other "operating conditions."

In addition to these "forward problems" where the goal is to perform some analysis or simulation on a given geometry-material model, another large class of applications requires solving the "inverse problem," where the goal is to determine/compute the geometry-material model in order to meet some constraint (e.g., weight) while optimizing performance (e.g., smallest deflection, min energy or stress, etc.). All these methods require repeatedly solving one or more forward problems "inside the loop" in order to solve the optimization problem.

At macroscale the macroscale geometry-material model 170 can be used to assign material properties to (any point of) the geometric model at the macroscale, again for the purpose of analysis, simulation or optimization. The macroscale geometry-material model 170 assigns a material tensor to a point at macroscale. The geometry at macroscale could come from several sources, for example, it could be "as designed" shape, even before the manufacturing process plan is created. In the design stage, a designer can assume or guess what material properties are desired, and using the models 165, 170, an analysis can actually predict what they are going to be, based on manufacturing process. In this manner, the optimal manufacturing processes may be selected for the part.

At the macroscale, the methods include some combination of the following well-known special cases, such as shape optimization (where the material model is fixed, but shape's boundaries can vary), topology optimization (where the material is fixed, but the shape can be anything inside some envelope), or material optimization (where the shape is fixed, but the material can vary).

The mesoscale model 165 is needed to evaluate the macroscale model 170 in the example applications provided above. The problems may be reformulated directly at the mesoscale level—looking for the best manufacturing process plan that achieves the goal.

In one example related to material optimization, the techniques described herein can be integrated into an iterative loop to seek for the optimal road configurations to maximize the desired mesoscale properties, such as stiffness, given the design geometry. The road configuration may be iteratively modified until the desired macroscale behavior is obtained. For example, the design geometry, build direction, boundary conditions and loads may be specified. An optimization objective may be defined, e.g., to minimize the compliance of the printed structure. Constraints may be specified, for example, total material consumptions. New road configurations may be generated subject to the constraints. The geometry-material model 165 may be computed to generate the effective stiffness. The road configurations may be updated subject to the constraints towards the optimization objective. The steps may be repeated until the desired goal is achieved.

Such procedures could be integrated into a 3D printer to allow the optimization to be performed on-the-fly or to adjust the printing toolpath based on the feedback from a closed loop feedback control system.

Another example related to topology optimization includes generating a new mesoscale model 165 in which every point is associated with a stiffness tensor and printing direction subject to the constraints. The macroscale model 170 is evaluated and compared with the optimization objective. The process is iterated until the objective is met. These optimization approaches allow optimization of the actual 3D printed manufactured structures.

A method for estimating a material characteristic of an article includes receiving a material property tensor having an associated reference direction. A tool path model of an additive manufacturing process for manufacturing the article is received. A geometric model is generated based on the tool path model defining a plurality of roads arranged in layers. For each of the roads, the material property measurement tensor is rotated to align the reference direction with a direction of the selected road and an estimated material property value is assigned to the selected road to generate a first geometry-material model of the article.

A system includes a memory to store a plurality of instructions and a processor to execute the instructions. The processor is to receive a material property tensor having an associated reference direction, receive a tool path model of an additive manufacturing process for manufacturing the article, generate a geometric model based on the tool path model defining a plurality of roads arranged in layers, and, for each of the roads, rotate the material property measurement tensor to align the reference direction with a direction of the selected road and assign an estimated material property value to the selected road to generate a first geometry-material model of the article.

In some embodiments, certain aspects of the techniques described herein may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM), or other non-volatile memory devices, and the like. The executable instructions stored on the non-transitory computer readable storage medium may be in source code, assembly language code, object code, or other instruction format that is interpreted or otherwise executable by one or more processors.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages and solutions to problems have been described above with regard to specific embodiments. However, the benefits, advantages, solutions to problems and any feature(s) that may cause any benefit, advantage or solution to occur or become more pronounced are not to be construed as a critical, required or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for estimating a material characteristic of an article, comprising:
   receiving a material property tensor having an associated reference direction;
   receiving a tool path model of an additive manufacturing process for manufacturing the article;
   generating a geometric model based on the tool path model defining a plurality of linear road segments arranged in layers;
   for each of the linear road segments, rotating the material property tensor to align the reference direction with a direction of a selected linear road segment and assigning an estimated material property value to the selected linear road segment to generate a first geometry-material model of the article suitable for material property analysis of the article.

2. The method of claim 1, wherein the material property tensor includes parameters generated from measurements of a test specimen having an effective domain, and the geometric model includes roads having geometries consistent with the effective domain.

3. The method of claim 2, wherein the effective domain removes voids between adjacent linear road segments.

4. The method of claim 1, wherein generating the geometric model comprises defining the roads as sweeps along line segments.

5. The method of claim 4, wherein the linear road segments have rectangular cross-sections.

6. The method of claim 1, further comprising:
   identifying nodes where two or more linear road segments overlap; and
   for each selected node, averaging the estimated material property value of each of the overlapping linear road segments to provide the estimated material property value at the selected node.

7. The method of claim 1, further comprising:
   accessing a library of material property tensors, each having an associated reference direction, and each being associated with a predetermined structure;
   identifying a structure in the geometric model corresponding to one of the predetermined structures in the library; and
   rotating the material property tensor of the predetermined structure to align the reference direction with a direction of the corresponding structure and assigning an estimated material property value to the corresponding structure in the geometry-material model of the article.

8. The method of claim 1, wherein the material property tensor comprises a fourth order tensor.

9. The method of claim 8, wherein a material property associated with the material property tensor comprises at least one of Young's modulus, bulk modulus, shear modulus, Poisson's ratio, Lame parameters or P-wave modulus.

10. The method of claim 1, wherein the material property tensor comprises a second order tensor.

11. The method of claim 10, wherein a material property associated with the material property tensor comprises at least one of electrical resistivity, thermal resistivity, electrical conductivity, thermal conductivity, dielectric constant, magnetic permeability or diffusion coefficient.

12. The method of claim 1, wherein the first geometry-material model comprises a mesoscale model, and the method further comprises homogenizing the mesoscale geometry-material model to generate a macroscale geometry-material model.

13. The method of claim 12, wherein homogenizing the mesoscale geometry-material model comprises homogenizing the mesoscale geometry-material model using Green's function.

14. A system, comprising:
   a memory to store a plurality of instructions; and
   a processor to execute the instructions to receive a material property tensor having an associated reference direction, receive a tool path model of an additive manufacturing process for manufacturing an article, generate a geometric model based on the tool path model defining a plurality of linear road segments arranged in layers, and, for each of the linear road segments, rotate the material property tensor to align the reference direction with a direction of a selected road and assign an estimated material property value to the selected road to generate a first geometry-material model of the article suitable for material property analysis of the article.

15. The system of claim 14, wherein the material property tensor includes parameters generated from measurements of a test specimen having an effective domain, and the geometric model includes linear road segments having geometries consistent with the effective domain.

16. The system of claim 15, wherein the effective domain removes voids between adjacent linear road segments.

17. The system of claim 14, wherein the processor is to generate the geometric model by defining the linear road segments as sweeps along line segments, wherein the sweeps have rectangular cross-sections.

18. The system of claim 14, wherein the processor is to identify nodes where two or more linear road segments overlap and, for each selected note, average the estimated material property value of each of the overlapping linear road segments to provide the estimated material property value at the selected node.

19. The system of claim 14, wherein the processor is to access a library of material property tensors, each having an associated reference direction, and each being associated with a predetermined structure, identify a structure in the geometric model corresponding to one of the predetermined structures in the library, and rotate the material property tensor of the predetermined structure to align the reference direction with a direction of the corresponding structure and assign an estimated material property value to the corresponding structure in the geometry-material model of the article.

20. The system of claim 14, wherein the material property tensor comprises a fourth order tensor.

21. The system of claim 14, wherein the material property tensor comprises a second order tensor.

22. The system of claim 14, wherein the first geometry-material model comprises a mesoscale model, and the processor is to homogenize the mesoscale geometry-material model to generate a macroscale geometry-material model.

23. The system of claim 14, wherein the processor is to homogenize the mesoscale geometry-material model using Green's function.

* * * * *